United States Patent
Vijayanathan et al.

(10) Patent No.: US 6,419,851 B1
(45) Date of Patent: Jul. 16, 2002

(54) MELT PROCESSIBLE LIQUID CRYSTALLINE TERPOLYESTERS AND PROCESS FOR THE PREPARATION THEREOF

(75) Inventors: Veena Vijayanathan; Vadakkethonippurathu Sivankutty Nair Prasad; Chennakkattu Krishna Sadasivan Pillai, all of Kerala (IN)

(73) Assignees: Council of Scientific and Industrial Research; Department of Science and Technology, both of New Delhi (IN)

( * ) Notice: Subject to any disclaimer, the term of this patent is extended or adjusted under 35 U.S.C. 154(b) by 0 days.

(21) Appl. No.: 09/537,251

(22) Filed: Mar. 28, 2000

(51) Int. Cl.$^7$ ................ C09K 19/32; C09K 19/38; C08G 63/60; C08G 63/81; C08G 63/80; C08G 63/88

(52) U.S. Cl. ............ 252/299.62; 252/299.67; 524/539; 524/540; 528/173; 528/176; 528/180; 528/272

(58) Field of Search ............ 252/299.01, 299.62, 252/299.67; 524/539, 540; 528/272, 173, 180, 176

(56) References Cited

U.S. PATENT DOCUMENTS 5,158,701 A * 10/1992 Asai et al. ............. 252/299.01
5,326,848 A * 7/1994 Kashimura et al. ......... 528/190
5,997,765 A * 12/1999 Furuta et al. .......... 252/299.01

FOREIGN PATENT DOCUMENTS

JP          10-60236     * 3/1998
JP        2000-318092    * 11/2000

OTHER PUBLICATIONS

JP 2000–318092 English Abstract, 2000.*
JP 10–60236 English Abstract, 1998.*

* cited by examiner

Primary Examiner—Shean C. Wu
(74) Attorney, Agent, or Firm—Ladas & Parry

(57) ABSTRACT

Melt processable liquid crystalline terpolyesters of the formula I below:

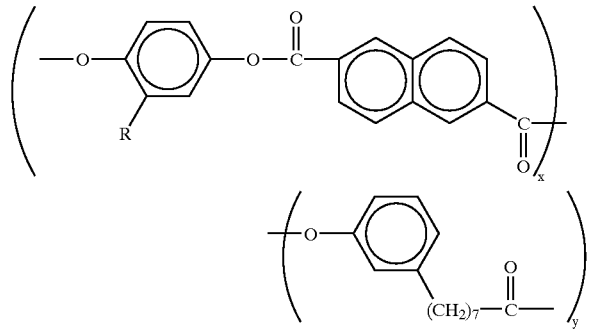

where R is Cl, $C_6H_5$, $CH_3CO$, $CH_3$, and process for the preparation thereof are disclosed. The process comprises acetylating 8(3-hydroxyphenyl)octanoic acid and hydroquinone using an acetylating agent followed by acidolysis polycondensation for the removal of acetic acid to effect higher molecular weight formation, post-polymerisation being effected at higher temperatures but below the decomposition temperature.

11 Claims, No Drawings

MELT PROCESSIBLE LIQUID CRYSTALLINE TERPOLYESTERS AND PROCESS FOR THE PREPARATION THEREOF

FIELD OF THE INVENTION

The present invention relates to melt processable liquid crystalline terpolyesters and a process for the preparation thereof. The terpolyesters of the invention have the structure shown in formula I below:

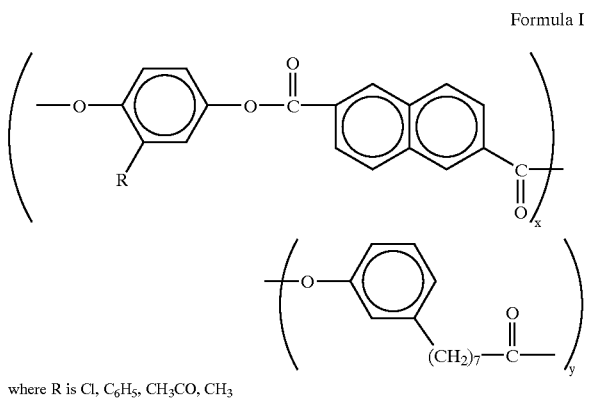

Formula I where R is Cl, $C_6H_5$, $CH_3CO$, $CH_3$

The terpolyesters prepared by the process of the present invention are poly(4-phenylene naphthalene-2,6-carboxylate-co-8(3-oxyphenyl)octanoate), poly(4-phenylene, 2-methoxynaphthalene-2,6-carboxylate-co-8(3-oxyphenyl)octanoate), poly(4-phenylene2-phenyl naphthalene-2,6-carboxylate-co-8(3-oxyphenyl)octanoate) and related terpolyesters. The terpolyesters prepared by the process of the present invention are liquid crystalline polymers which can be used in electronics (eg. surface mount units, connectors, printing wiring boards etc. where low coefficient of thermal expansion and low dielectric properties are required), in computer fields, in industry for making chemically resistant parts (eg. tower packing saddles to replace ceramics). The industries to which the invention can apply are plastic industries/electronic industries/computer industries.

BACKGROUND OF THE INVENTION

Thermotropic liquid crystalline terpolyesters obtained from rigid monomers, such as 4-hydroxybenzoic acid are intractable, insoluble and not processable because they decompose prior to melting and their transition temperatures are too high for the existing equipment to process them. (A. I. Isayev, T. Kyu and S. Z. D. Cheng, *Liquid Crystalline Polymer Systems: Technological Advances*, American Chemical Society, Washington, D.C., 1996; H. Stegemeyer, Guest Ed., *Liquid Crystals*, in Topics in Physical Chemistry (Eds. H. Baumgartel, E. U. Franck and W. Grunbein), Vol. 3, Steinkopff Darmstadt, Springer, New York, 1994; L. L. Chapoy, Ed.: "*Recent Advances in Liquid Crystalline Polymers*" Elsevier, London, 1985 A. Blumstein (Ed), Polymeric Liquid Crystals, Plenum Press, New York (1985); C. Noel and P. Navard, *Progr. Polym. Sci.*, 16, 55–110 (1991); Jan Frank, Zbigniew J. Jedlinski and J. Majnus in Hand Book of Polymer Synthesis, H. R. Kricheldorf (Ed), (1991); W. J. Jackson, Jr. and H. F. Kuhfuss, *J. Appl. Polym. Sci.*, 25, 1685 (1985); A. J. East, L. F. Charbenneau and G. W. Calundann, *Mol. Cryst. Liq. Inc. Non Linear Opt*, 157, 615 (1988); A. Roviello and A. Sirigu, *J. Polym. Sci. Polym. Lett. Edn.*, 13, 455 (1975); C. K. Ober, J. I. Jin and R. W. Lenz, *Adv. Polym. Sci.*, 13, 103 (1984); A. Blumstein, K. N. Sivaramakrishnan, S. B. Cloughand R. B. Blumstein, *Mol. Cryst. Liq. Cryst.* (*Lett*), 49, 255 (1979); H. R. Kricheldorf and L. G. Wilson, *Macromolecules*, 27, 1669 (1994); P. K. Bhowmilk and H. Han, *J. Polym. Sci. Part A: Polym. Chem.* 33, 415 (1995); V. Percec and H. Oda, *J. Polym. Sci. Part A: Polym. Chem.* 33, 2359 (1995); J. Economy and K. Goranov, *Advances in Polymer Science*, Vol. 117, High Performance Polymers, Springer verlag, Berlin, Heidelberg, 1994; C. K. S. Pillai, D. C. Sherrington and A. Sneddon, *Polymer*, 33, 3968 (1992); M. Saminathan, C. K. S. Pillai and C. Pavithran, *Macromolecules*, 26, 7103 (1993); J. D. Sudha, C. K. S. Pillai and S. Bera, *J. Polym. Mater.*, 13, 317 (1996); H. Zhang, G. R. Davies and I. M. Ward, *Polymer*, 33, 2651 (1992)).

There have been a large number of attempts to bring down the transition temperatures to a processable range (W. J. Jackson, Jr. and H. F. Kuhfuss, *J. Appl. Polym. Sci.*, 25, 1685 (1985); A. J. East, L. F. Charbenneau and G. W. Calundann, *Mol. Cryst. Liq. Inc. Non Linear Opt*, 157, 615 (1988); A. Roviello and A. Sirigu, *J. Polym. Sci. Polym. Lett. Edn.*, 13, 455 (1975); C. K. Ober, J. J. Jin and R. W. Lenz, *Adv. Polym. Sci.*, 13, 103 (1984); A. Blumstein, K. N. Sivaramakrishnan, S. B. Ceough and R. B. Blumstein, *Mol. Cryst. Liq. Cryst.* (*Lett*). 49, 255 (1979); H. R. Kricheldorf and L. G. Wilson, *Macromolecules*, 27, 1669 (1994); P. K. Bhowmik and H. Han, *J. Polym. Sci. Part A: Polym. Chem.* 33, 415 (1995); V. Percec and H. Oda, *J. Polym. Sci. Part A: Polym. Chem.* 33, 2359 (1995); J. Economy and K. Goranov, *Advances in Polymer Science*, Vol. 117, High Performance Polymers, Springer verlag, Berlin, Heidelberg, 1994; C. K. S. Pillai, D. C. Sherrington and A. Sneddon, *Polymer*, 33, 3968 (1992)). A number of chemical approaches have been devised to arrive at structures that have lower transition temperatures and lower symmetries. These approaches involve disrupting the ordered structures of the homopolyesters by introducing chain disruptors such as flexible unit, a kink structure, or crank shaft structures etc. or by copolymerising with suitable comonomers that bring down the transition temperatures (W. J. Jackson, Jr. and H. F. Kuhfuss, *J. Appl. Polym. Sci.*, 25, 1685 (1985); A. J. East, L. F. Charbenneau and G. W. Calundann, *Mol. Cryst. Liq. Inc. Non Linear Opt*, 157, 615 (1998); A. Roviello and A. Sirigu, *J. Polym. Sci. Polym. Lett. Edn.*, 13, 455 (1975); C. K. Ober, J. J. Jin and R. W. Lenz, *Adv. Polym. Sci.*, 13, 103 (1984); A. Blumstein, K. N. Sivaramakrishnan, S. B. Clough and R. B. Blumstein, *Mol. Cryst. Liq. Cryst.* (*Lett*), 49, 255 (1979); H. R. Kricheldorf and L. G. Wilson, *Macromolecules*, 27, 1669 (1994); P. K. Bhowmilk and H. Han, *J. Polym. Sci. Part A: Polym. Chem.* 33, 415 (1995); V. Percec and H. Oda, *J. Polym. Sci. Part A: Polym. Chem.* 33, 2359 (1995); J. Economy and K. Goranov, *Advances in Polymer Science*, Vol. 117, High Performance Polymers, Springer verlag, Berlin, Heidelberg, 1994; C. K. S. Pillai, D. C. Sherrington and A. Sneddon, *Polymer*, 33, 3968 (1992)). A number of copolyesters have thus been prepared out of which a few commercial polymers such as Vectra®, and Xydar®, are well known. It is, however, now realised that these copolyesters still have a processing temperature above 300° C. and hence require newer methods or structures to overcome this problem. It is well known that introduction of disruptors such as a "kink" or flexible segments brings down the transition temperature of liquid crystalline polyesters to a processable range (J. Economy and K. Goranov, *Advances in Polymer Science*, Vol. 117, High Performance Polymers, Springer verlag, Berlin, Heidelberg, 1994; A. I. Isayev, T. Kyu and S. Z. D. Cheng, *Liquid Crystalline Polymer Systems: Technological Advances,* American Chemical Society, Washington, D.C., 1996). It has been shown that copolymerisation of hydroxy benzoic acid with comonomers having kink or flexible structures gives rise to decrease in the transition temperatures. Although a variety of comonomers containing such structural features have been employed for the synthesis of liquid crystalline copolyesters, use of a comonomer having both a kink and flexible segment built into the same molecule is rare. 8(3-hydroxyphenyl)octanoic acid is, thus, a comonomer having both kink and flexible segments in its structure which when copolymerised with hydroxy benzoic acid gave a transition temperature as low as 256° C. (C. K. S. Pillai, D. C. Sherrington and A. Sneddon, *Polymer,* 33, 3968 (1992)); However, it was noted that this polymer although liquid crystalline, decompose before melting (Rajalekshmi, M. Saminathan, C. K. S. Pillai and C. P. Prabhakaran, J. Polym. Sci., Polym. Chem., 34, (2851) 1996). It was therefore thought that appropriate substitution in the phenolic ring may give rise to meltable polymers and hence expected to bring down the transition temperature when copolymerised stands a significant chance for contributing to solving this problem. The drawbacks of the currently marketed liquid crystalline polyesters are that polyesters of 4-hydroxy benzoic acid do not form a melt below its decomposition temperature and liquid crystalline copolyesters like 4-hydroxy benzoic acid/polyethylene terepthalate system (Eastman X76) has several shortcomings in that the heat distortion temp is low (<90° C.) and the thermal stability is low because esters of aliphate diols decompose above 300° C. via cis-beta elimination to yield olefins. Besides at mole ratios 4-hydroxybenzoic acid/polyethylene terepthalate greater than 1.5:1.0, heterogeneous materials are obtained containing crystallites of nearly pure poly(4-hydroxybenzoates). In general, aromatic polyesters are highly crystalline, infusible, and insoluble in known solvents. Several approaches have been adopted to reduce the crystallinity in these polymers and decrease the melting transitions to an amenable range. One approach is to use a bulky substituent such as phenyl hydroquinone which enters the polymer main chain in a random head-to-tail orientation to prevent close packing and to frustrate the chain organisation into the polymer crystals (W. J. Jackson, Br. Polym. J., 12, 154 (1980); P. K. Bhowmik, E. D. T. Atkins, R. W. Lenz, Macromolecules, 26, 440, 1993). These hydroquinone copolymers for the basis of Vectra® family of thermotropic liquid crystalline polymers.

OBJECTS OF THE INVENTION

It is an object of the invention to provide novel melt processible liquid crystalline terpolyesters.

It is a further object of the invention to provide novel liquid crystalline terpolyesters having transition temperature lower than that of poly(4-hydroxybenzoic acid) and in the processible range below 300° C. and having nematic mesophase from naphthalene dicarboxylic acid, hydroquinones and 8-(3 hydroxy phenyl)octanoic acid.

It is a further object of the invention to provide liquid crystalline melt processable terpolyesters that do not decompose before melting.

Another object of the invention is to provide melt processable liquid crystalline terpolyesters that do not use expensive monomers.

A further object of the invention is to provide a liquid crystalline terpolyester that results in a higher molecular weight polymer.

It is yet another object of the invention to provide a process for the preparation of a melt processable liquid crystalline terpolyester.

It is a further object of the invention to provide a process for the preparation of liquid crystalline melt processable terpolyesters that do not decompose before melting.

Another object of the invention is to provide a process for the preparation of melt processable liquid crystalline terpolyesters that do not use expensive monomers.

A further object of the invention is to provide a process for the preparation of a liquid crystalline terpolyester that results in a higher molecular weight polymer.

SUMMARY OF THE INVENTION

Accordingly the present invention provides novel melt processable liquid crystalline terpolyesters of the formula I below:

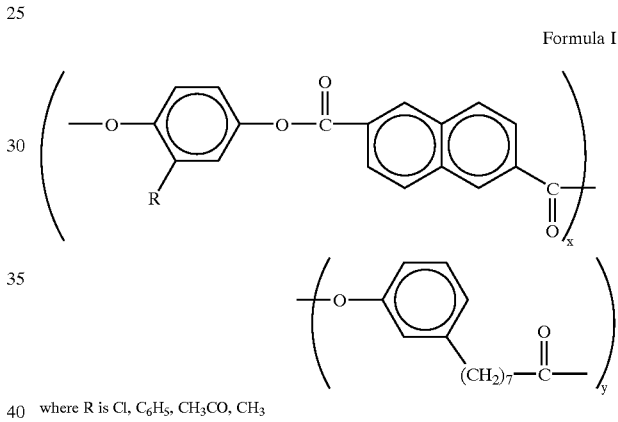

Formula I where R is Cl, $C_6H_5$, $CH_3CO$, $CH_3$

In one embodiment of the invention, the novel terpolyesters of the invention are poly(4-phenylene naphthalene, 2,6-carboxylate-co-8(3-oxyphenyl)oxtanoate)s, poly(4-phenylene,2-methoxynaphthalene-2,6-carboxylate-co-8(3-oxyphenyl)octanoate)s, poly(4-phenylene,2-phenyl naphthalene-2,6-carboxylate-co-8(3-oxyphenyl)octanoate)s and related terpolyesters.

The present invention also provides a process for the preparation of melt processible liquid crystalline terpolyesters of the general formula I above, said process comprising acetylating 8(3-hydroxyphenyl) octanoic acid and hydroquinone using an acetylating agent followed by acidolysis polycondensation at a temperature in the range of 260–300° C. for a period of about 6–24 hrs under reduced pressure for the efficient removal of acetic acid to effect higher molecular weight formation, post-polyermisation being effected at higher temperatures but below the decomposition temperature for extended time and purification by soxhlet extraction using solvent mixtures selected from the group comprising of acetone-alcohol, acetone-methylethyl ketone.

In one embodiment of the invention, the acidolysis polycondensation is carried out in the optional presence of a high temperature solvent.

In another embodiment of the invention, the acidolysis polycondensation is carried out in the optional presence of a transesterification catalyst.

In a further embodiment of the invention, the transesterification catalyst is selected from the group comprising of acetates of lead, magnesium, cobalt, antimony, zinc, and the like.

In a further embodiment of the invention, the metal acetate catalyst is selected from the group comprising of lead acetate, calcium acetate, zinc acetate and antimony acetate.

In yet another embodiment of the invention, the high temperature solvent used is selected from Marlotherm® (Huls Ag, Marl, Germany), Dowtherm® (M/s Spectrochem, Mambai, India) and dibenzyl benzene.

In a further embodiment of the invention, the acetylating agents are selected from excess phthalic anhydride, trifluoroacetic anhydride, chloroacetic anhydride or acetic anhydride.

In a further embodiment of the invention, a postpolymerisation reaction is carried out to improve the molecular weight of the polymer.

The main finding underlying the present invention is our observation that poly(4-phenylene naththalene-2,6-carboxylate-co-8(3-oxyphenyl octanoate)s, poly(4-phenylene,2-methoxynaphthalene-2,6-carboxylate-co-8(3-oxyphenyl)oxtanoate)s, poly(4-phenylene,2phenyl naphthalene-2,6-carboxylate-co-8(3-oxyphenyl)octanoate)s and related terpolyesters prepared by the process of acidolysis melt polycondensation of 2,6 naphthalene dicarboxylic acid with diacetoxy benzene and 8-(3 acetoxy phenyl) octanoic at 280° C. have been found to give nematic mesophase transition in the range of @ 220–240° C. with textures corresponding to nematic thread. These terpolyestes are thermotropic liquid crystalline polymers having thermal stability value in the range of $T_i$ (Temperature at which thermal decomposition is initiated) 370–390° C.

DETAILED DESCRIPTION OF THE INVENTION

The process of the present invention has essentially the following steps: in situ acetylation of the monomers, hydroquinone and 8-(3 hydroxy phenyl) octanoic acid in presence of acetylating agents such as excess phthalic anhydride, trifluoroacetic anhydride, acetic anhydride or chloroacetic anhydride and acidolysis polycondensation of the acetoxy derivative of the hydroxy acid and the diol with 2,6 naphthalene dicarboxylic acid by acidolysis polycondensation in presence of transesterification catalysts such as magnesium acetate, antimony trioxide, lead acetate etc. at higher temperatures in the order of 240–280° C. for 2–6 hrs in inert atmospheres. Polymerisation was further continued under reduced pressure of 1–3 mm of Hg at a temperature range of 260–280° C. for a period of 1–6 hrs. This was followed by a postpolymerisation step carried out at a temperature in the range of 260–280° C. under inert atmosphere for 24–72 hrs and a purification step involving solvent extraction using solvent mixtures such as acetone-methanol, acetone-methylethyl ketone, acetone-isopropanol mixtures etc.

The process for the preparation of liquid crystalline poly(4-phenylene naphthalene-2,6-carboxylate-co-8(3-oxyphenyl)octanoate)s, poly(4-phenylene,2-methoxynaphthalene-2,6-carboxylate-co-8(3-oxyphenyl) octanoate)s, poly(4-phenylene,2-phenyl naphthalene-2,6-carboxylate-co-8(3-oxyphenyl)octanoate)s, of formula I comprises in situ acetylation of the monomers, hydroquinone and 8-(3 hydroxy phenyl)octanoic acid in presence of acetylating agents such as excess phthalic anhydride, trifluoroacetic anhydride, chloroacetic anhydride or acetic anhydride and acidolysis polycondensation of the acetoxy derivative of the hydroxy acid and the diol with 2,6 naphthalene dicarboxylic acid by acidolysis polycondensation in presence of transesterification catalysts such as magnesium acetate, antimony trioxide, lead acetate etc at higher temperatures using acetylating agents in presence of catalysts polymerisation in the presence of a high temperature solvent or without the solvent media, with or without catalyst at a temperature range of 260–300° C. for a period of about 6–24 hrs in the absence of a catalyst or in presence of transesterification catalysts such as acetates of lead, magnesium, cobalt, antimony etc. under reduced pressure for the efficient removal of acetic acid to effect higher molecular weight formation with post polymerisation effected at higher temperatures below the decomposition temperature for longer times and purification involving soxhlet extraction using solvent mixtures such as acetone-alcohol, acetone-methylethyl ketone etc.

The invention is described in detail in the following examples which are provided by way of illustration only and should not be construed to limit the scope of the invention.

EXAMPLE 1

In a 60 ml polymerisation tube 0.20 mol of 8(3-hydroxy phenyl)octanoic acid, 0.40 mol of hydroquinone, and 0.40 mol of 2,6 naphthalene dicarboxylic acid were taken mixed with 0.08 mol of acetic anhydride and 0.01 mmol of magnesium acetate were added and heated under slow stirring in a slow purge of nitrogen to 140–150° C. and continued the heating for ½ hr. Then temperature was increased to 250–300° C. and continued for 2–3 hrs. Polymerisation was further continued at 0.01 mm of Hg pressure for 1–2 hrs. Then the polymer was chipped out of the tube and purified by soxhlet extraction using acetone/isopropanol mixture for about 18 hrs and dried in an air oven at 60° C. for about 3 hrs at reduced pressure.

EXAMPLE 2

In a 60 ml polymerisation tube 0.10 mol of 8(3-hydroxyphenyl)octanoic acid, 0.45 mol of hydroquinone, and 0.45 mol of 2,6 naphthalene dicarboxylic acid were taken mixed with 0.08 mol of acetic anhydride and 0.01 mmol of magnesium acetate were added and heated under slow stirring in a slow purge of nitrogen to 140° C. and continued the heating for ½ hr. Then temperature was increased to 250–300° C. and continued for 2–3 hrs. in presence of 3 ml of high temperature solvent Dowtherm®. Polymerisation was further continued at 0.01 mm of Hg pressure for 1–2 hrs. Then the polymer was chipped out of the tube and purified by soxhlet extraction using acetone/isopropanol mixture for about 18 hrs and dried in an air oven at 60° C. for about 3 hrs at reduced pressure.

EXAMPLE 3

In a 60 ml polymerisation tube 0.2 mol of 8(3-hydroxyphenyl)octanoic acid, 0.40 mol of 2 phenyl hydroquinone, and 0.40 mol of 2,6 naphthalene dicarboxylic acid were taken mixed with 0.08 mol of acetic anhydride and 0.01 mmol of magnesium acetate were added and heated under slow stirring in a slow purge of nitrogen to 140° C. and continued the heating for ½ hr. Then temperature was increased to 250–300° C. and continued for 2–3 hrs. Polymerisation was further continued at 0.01 mm of Hg pressure for 1–2 hrs. Then the polymer was chipped out of the tube and purified by soxhlet extraction using acetone/isopropanol mixture for about 18 hrs and dried in an air oven at 60° C. for about 3 hrs at reduced pressure.

EXAMPLE 4

In a 60 ml polymerisation tube 0.20 mol of 8(3-hydroxyphenyl)octanoic acid, 0.40 mol of 2 methoxy hydroquinone, and 0.40 mol of 2,6 naphthalene dicarboxylic acid were taken mixed with 0.08 mol of acetic anhydride and 0.01 mmol of magnesium acetate were added and heated under slow stirring in a slow purge of nitrogen to 140° C. and continued the heating for ½ hr. Then temperature was increased to 250–300° C. and continued for 2–3 hrs. in presence of 3 ml of high temperature solvent Dowtherm®. Polymerisation was further continued at 0.01 mm of Hg pressure for 1–2 hrs. Then the polymer was chipped out of the tube and purified by soxhlet extraction using acetone/isopropanol mixture for about 18 hrs and dried in an air oven at 60° C. for about 3 hrs at reduced pressure.

The advantages of the present invention are the following:

The present invention provides a process for the preparation of melt processable liquid crystalline terpolyester from 8(3-hydroxyphenyl)octanoic acid, hydroquinones and 2,6-naphthalene dicarboxylic acid. The liquid crystalline terpolyester obtained from 8(3-hydroxyphenyl)octanoic acid, hydroquinones and 2,6-naphthalene dicarboxylic acid of formula I has a transition temperature @ 220–240° C. which is lower than those (300° C.) of the commercial liquid crystalline copolyester such as Vectra® and terpolyesters such as Xydar®. Hence, the liquid crystalline terpolyester obtained by the process of the present invention can be melt processed at a lower temperature than that of Vectra® and Xydar® and this may solve many of the processing problems associated with the existing commercial liquid crystalline polymers. The liquid crystalline terpolyesters obtained by the process of the present invention do not decompose before melting whereas poly(4-hydroxybenzoate) decomposes prior to melting. As the present invention described by the present process of preparation of liquid crystalline terpolyester from 8(3-hydroxyphenyl)octanoic acid, hydroquinones and 2,6-naphthalene dicarboxylic acid does not use a comonomer which is too expensive, the cost of the liquid crystalline terpolyester obtained by the present process is rather low when compared to those of Vectra® and Xydar®. 8(3-hydroxyphenyl)octanoic acid and hydroquinone, the comonomers used in the preparation of the terpolyester prepared by the process of the present invention, are comparatively cheaper. The process of the present invention has a step of post-polymerisation whereby a higher molecular weight is obtained so that the properties of the polymer are better. This terpolyester has got comparatively higher decomposition temperature, Ti of @ 370–390° C. The cost of the terpolyesters are comparatively less than that of the commercial copolyesters. It shows drastic reduction in viscosity due to nematic mesophase which is required for further processing by injection molding and extrusion.

We claim:

1. Melt processable liquid crystalline terpolyesters of the formula I below:

Formula I

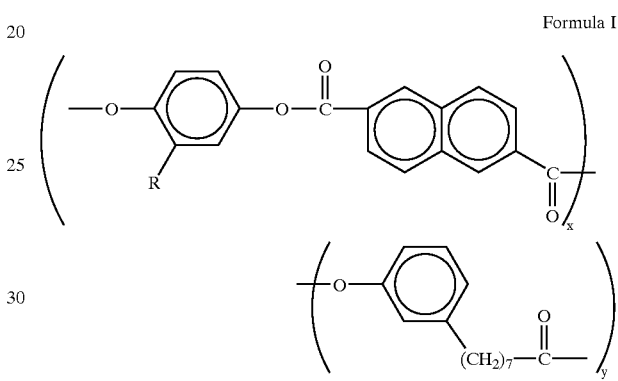

where R is Cl, $C_6H_5$, $CH_3CO$, $CH_3$

2. Melt processable liquid crystalline terpolyesters selected from poly(4-phenylene naphthalene-2,6-carboxylate-co-8(3-oxyphenyl)octanoate)s, poly(4-phenylene,2-methoxynaphthalene-2,6-carboxylate-co-8(3-oxyphenyl)octanoate)s, poly(4-phenylene,2-phenyl naphthalene-2,6-carboxylate-co-8(3-oxyphenyl)octanoate)s and related terpolyesters.

3. A process for the preparation of melt processable liquid crystalline terpolyesters of the general formula I

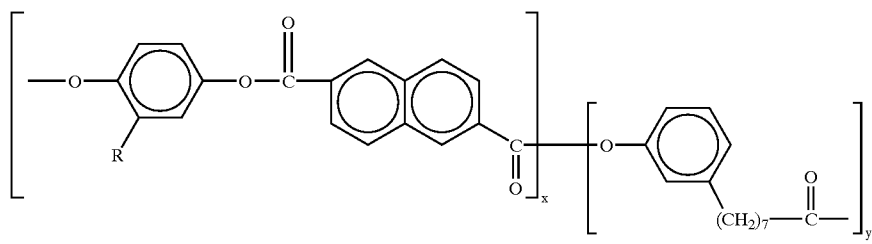

where R is Cl, $C_6H_5$, $CH_3CO$, or $CH_3$ where R is Cl, $C_6H_5$, $CH_3CO$, or $CH_3$ and said process comprising acetylating 8(3-hydroxyphenyl)octanoic acid and hydroquinone using an acetylating agent followed by acidolysis polycondensation at a temperature in the range of 260–300° C. for a period of about 6–24 hrs under reduced pressure for the efficient removal of acetic acid, post-polymerisation being effected at temperatures below the decomposition temperature for extended time and purification by solvent extraction using solvent mixtures selected from the group comprising acetone-alcohol, and acetone-methyl ethyl ketone.

4. A process as claimed in claim 3 wherein the acetylating agent comprises an acid anhydride selected from the group consisting phthalic anhydride, trifluoroacetic anhydride, acetic anhydride, and chloroacetic anhydride.

5. A process as claimed in claim 3 wherein the polycondensation is carried out in the presence of a transesterification metal acetate catalyst.

6. A process as claimed in claim 5 wherein the polycondensation is carried out in the presence of a metal acetate catalyst selected from the group consisting of copper acetate, sodium acetate, magnesium acetate, lead acetate, calcium acetate, zinc acetate, and antimony triacetate.

7. A process as claimed in claim 3 wherein the polycondensation is carried out in the presence of a solvent.

8. A process as claimed in claim 7 wherein the solvent used during the polycondensation step is selected from dibenzyl benzene and dibenzyl benzene with tribenzyl benzene.

9. A process as claimed in 3 wherein a postpolymerisation reaction is carried to improve molecular weight of the polymer.

10. The terpolyester of claim 1 wherein the decomposition temperature in the range Ti of 370–390° C.

11. The terpolyester of claim 1 wherein the terpolyesters exhibits nematic mesophase under polarised light microscope.

* * * * *